(12) United States Patent
Jin et al.

(10) Patent No.: US 11,125,898 B2
(45) Date of Patent: Sep. 21, 2021

(54) METHOD AND SYSTEM FOR POSITIONING SEISMIC SOURCE IN MICROSEISM MONITORING

(71) Applicants: China National Petroleum Corporation, Beijing (CN); BGP Inc., China National Petroleum Corporation, Hebei (CN)

(72) Inventors: Qihu Jin, Beijing (CN); Congwei Liu, Beijing (CN); Yanpeng Li, Beijing (CN); Fei Li, Beijing (CN); Gang Xu, Beijing (CN); Fangdong Chu, Beijing (CN)

(73) Assignees: China National Petroleum Corporation, Beijing (CN); BGP Inc., China National Petroleum Corporation, Zhuozhou (CN)

( * ) Notice: Subject to any disclaimer, the term of this patent is extended or adjusted under 35 U.S.C. 154(b) by 227 days.

(21) Appl. No.: 16/263,118

(22) Filed: Jan. 31, 2019

(65) Prior Publication Data

US 2019/0162867 A1 May 30, 2019

Related U.S. Application Data

(63) Continuation of application No. PCT/CN2017/081583, filed on Apr. 24, 2017.

(30) Foreign Application Priority Data

Aug. 29, 2016 (CN) .......................... 201610750747.8

(51) Int. Cl.
*G01V 1/28* (2006.01)
*G01V 1/00* (2006.01)
*G01V 1/30* (2006.01)

(52) U.S. Cl.
CPC .............. *G01V 1/288* (2013.01); *G01V 1/005* (2013.01); *G01V 1/30* (2013.01); *G01V 2210/123* (2013.01); *G01V 2210/6222* (2013.01)

(58) Field of Classification Search
CPC .......... G01V 1/288; G01V 1/005; G01V 1/30; G01V 2210/123; G01V 2210/6222; G01V 1/32; G01V 1/42
See application file for complete search history.

(56) References Cited

U.S. PATENT DOCUMENTS 8,209,125 B2 * 6/2012 Berkovitch ............... G01V 1/32
702/14
8,995,224 B2 * 3/2015 Esmersoy ................ G01V 1/42
367/27

(Continued)

FOREIGN PATENT DOCUMENTS

| CN | 102129063 A | 7/2011 |
| CN | 103105622 A | 5/2013 |

(Continued)

OTHER PUBLICATIONS

First Office Action and Search Report, CN App. No. 201610750747.8 (including English translation).

(Continued)

*Primary Examiner* — Elias Desta
(74) *Attorney, Agent, or Firm* — Foley & Lardner LLP

(57) ABSTRACT

The embodiments of the present application include acquiring a monitoring region and each observation point therein; partitioning the monitoring region into N layers of grids according to a seismic source positioning accuracy, wherein a side length of a grid cell of an i-th layer of grid is $D/2^{i-1}$, $i=1, \ldots N$, and D is an initial side length of the grid cell and not more than a double of a distance between the respective observation points; searching all nodes in a first layer of grid (Continued)

to acquire a node satisfying a preset condition therefrom; from i=2, determining and searching nodes satisfying a first preset requirement in the i-th layer of grid, to acquire a node satisfying the preset condition therefrom, until a search in an N-th layer of grid is completed, wherein a node satisfying the preset condition acquired in the N-th layer of grid is a seismic source point location.

18 Claims, 7 Drawing Sheets

(56) References Cited

U.S. PATENT DOCUMENTS

| | | | |
|---|---|---|---|
| 10,429,529 B2* | 10/2019 | Purves | G01V 1/30 |
| 2005/0190649 A1 | 9/2005 | Eisner et al. | |
| 2012/0116680 A1 | 5/2012 | Fei et al. | |
| 2015/0057937 A1 | 2/2015 | Abel | |

FOREIGN PATENT DOCUMENTS

| | | |
|---|---|---|
| CN | 104076392 A | 10/2014 |
| CN | 105022031 A | 11/2015 |
| CN | 105093274 A | 11/2015 |
| CN | 105093298 A | 11/2015 |
| CN | 105277971 A | 1/2016 |
| CN | 105549077 A | 5/2016 |
| CN | 105842735 A | 8/2016 |
| CN | 106324670 A | 1/2017 |
| EP | 2 818 897 A2 | 12/2014 |
| WO | WO-2013/169937 A1 | 11/2013 |

OTHER PUBLICATIONS

International Search Report, PCT/CN2017/081583 (dated Jul. 12, 2017).

Li et al., "Micro-earthquake location by means of Source-Scanning Algorithm," Earthquake, vol. 26, No. 3, pp. 107-114 (Jul. 2006).

Song et al., "Automatic identification and location of microseismic events," Geophysical Prospecting for Petroleum, vol. 48, No. 2, pp. 283-288.

Zhang et al., "Study and application of objective function in microseismic source location," Coal Geology & Exploration, vol. 43, No. 6, pp. 105-108 (Dec. 2015).

Canadian Examination Report, App. No. 3,022,158, 3 pages (Sep. 2019).

\* cited by examiner

METHOD AND SYSTEM FOR POSITIONING SEISMIC SOURCE IN MICROSEISM MONITORING

CROSS-REFERENCE TO RELATED PATENT APPLICATIONS

This application is a continuation of PCT/CN2017/081583, filed Apr. 24, 2017, which claims the benefit of and priority to Chinese Patent Application No. 201610750747.8, filed Aug. 29, 2016, both of which are incorporated herein by reference in their entireties.

TECHNICAL FIELD

The present application relates to the field of borehole geophysical exploration technologies, and particularly, to a method and system for positioning a seismic source in microseism monitoring.

BACKGROUND

The microseism monitoring technology is a geophysical technology that monitors influences, effects, and underground states of the production activities by observing and analyzing microseism events generated during the production activities, and it plays an important role in the fields such as hydraulically-created fracture monitoring, oilfield safety monitoring, oilfield dynamic monitoring and mine safety. With the microseism monitoring technology, it is possible to not only analyze the morphological characteristics and the distribution rule of the underground fractures, but also estimate the effective reservoir reform volume and the future production trend.

The key of the microseism monitoring technology is to accurately determine the location of the seismic source. Currently, in the conventional micro seismic source positioning method based on the forward model, the location of the micro seismic source is determined by uniformly meshing the monitoring region and searching node by node, wherein the meshing size is determined by the accuracy. The positioning speed of this method depends on the monitoring accuracy, i.e., the required meshing is increasingly denser as the monitoring accuracy rises, and the calculation amount caused will be very large. When the monitoring accuracy is low, it is often difficult for the monitoring results to meet the requirements although the calculation speed can be increased.

SUMMARY

The objective of the embodiments of the present application is to provide a method and a system for positioning a seismic source in microseism monitoring, which can achieve a high-accuracy positioning with a small calculation amount.

In order to achieve the above objective, the embodiments of the present application provide a method for positioning a seismic source in microseism monitoring, including:

acquiring a monitoring region and each observation point therein;

partitioning the monitoring region into N layers of grids according to a seismic source positioning accuracy, wherein a side length of a grid cell of an i-th layer of grid is $D/2^{i-1}$, i=1, ... N, and D is an initial side length of the grid cell and not more than a double of a distance between the respective observation points;

searching all nodes in a first layer of grid to acquire a node satisfying a preset condition therefrom;

from i=2, determining and searching nodes satisfying a first preset requirement in the i-th layer of grid, to acquire a node satisfying the preset condition therefrom, until a search in an N-th layer of grid is completed, wherein a node satisfying the preset condition acquired in the N-th layer of grid is a seismic source point location; and the first preset requirement is falling within a circle centered on a node satisfying the preset condition in the (i−1)-th layer of grid with a radius of $\sqrt{2} \times D/2^{i-1}$.

In order to achieve the above objective, the embodiments of the present application further provide a method for positioning a seismic source in microseism monitoring, including:

acquiring a monitoring region and each observation point therein;

partitioning the monitoring region into N layers of grids according to a seismic source positioning accuracy, wherein a side length of a grid cell of an i-th layer of grid is $D/2^{i-1}$, i=1, ... N, and D is an initial side length of the grid cell and not more than a double of a distance between the respective observation points;

searching all nodes in a first layer of grid to acquire a node satisfying a preset condition therefrom;

when i=2, determining and searching nodes satisfying a first preset requirement in the i-th layer of grid, to acquire a node satisfying the preset condition therefrom, wherein the first preset requirement is falling within a circle centered on a node satisfying the preset condition in the (i−1)-th layer of grid with a radius of $\sqrt{2} \times D/2^{i-1}$;

from i=3, determining and searching nodes satisfying a second preset requirement in the i-th layer of grid, to acquire a node satisfying the preset condition therefrom, until a search in an N-th layer of grid is completed, wherein a node satisfying the preset condition acquired in the N-th layer of grid is a seismic source point location; and the second preset requirement is falling within a circle centered on a node satisfying the preset condition in the (i−2)-th layer of grid with a radius of $\sqrt{2} \times D/2^{i-1}$, and simultaneously falling within the circle centered on the node satisfying the preset condition in the (i−1)-th layer of grid with the radius of $\sqrt{2} \times D/2^{i-1}$.

A method for positioning a seismic source in microseism monitoring provided by the embodiments of the present application may further include:

(1) acquiring a monitoring region and each observation point therein;

(2) performing a first layer of grid partitioning for the monitoring region according to a preset initial side length D of a grid cell, and searching all nodes therein to acquire a node satisfying a preset condition, wherein the initial side length is not more than a double of a distance between the respective observation points.

(3) judging whether the side length of a current grid cell satisfies a seismic source positioning accuracy, and if the judgement is No, from i=2, performing an i-th layer of grid partitioning for the monitoring region by taking the side length of the grid cell as $D/2^{i-1}$, wherein i=2, 3, 4 ... ;

(4) searching nodes satisfying a first preset requirement in the i-th layer of grid, to acquire a node satisfying the preset condition therefrom, the first preset requirement being falling within a circle centered on a node satisfying the preset condition in the (i−1)-th layer of grid with a radius of $\sqrt{2} \times D/2^{i-1}$, and repeating steps (3) and (4) until the judgement in step (3) is Yes; at that time, a node satisfying the preset condition in the i-th layer of grid is a seismic source point.

A method for positioning a seismic source in microseism monitoring provided by the embodiments of the present application may further include:

(1) acquiring a monitoring region and each observation point therein;

(2) performing a first layer of grid partitioning for the monitoring region according to a preset initial side length D of a grid cell, and searching all nodes therein to acquire a node satisfying a preset condition, wherein the initial side length is not more than a double of a distance between the respective observation points;

(3) performing a second layer of grid partitioning for the monitoring region by taking the side length of the grid cell as $D/2^{i-1}$, wherein i=2, and searching nodes satisfying a first preset requirement in the second layer of grid to acquire a node satisfying the preset condition therefrom; wherein the first preset requirement is falling within a circle centered on a node satisfying the preset condition in the (i−1)-th layer of grid with a radius of $\sqrt{2} \times D/2^{i-1}$;

(4) judging whether the side length of a current grid cell satisfies a seismic source positioning accuracy, and if the judgement is No, from i=3, performing an i-th layer of grid partitioning for the monitoring region by taking the side length of the grid cell as $D/2^{i-1}$, wherein i=3, 4 . . . ;

(5) searching nodes satisfying a second preset requirement in the i-th layer of grid, to acquire a node satisfying the preset condition therefrom, the second preset requirement being falling within a circle centered on a node satisfying the preset condition in the (i−2)-th layer of grid with a radius of $\sqrt{2} \times D/2^{i-2}$, and simultaneously falling within the circle centered on the node satisfying the preset condition in the (i−1)-th layer of grid with the radius of $\sqrt{2} \times D/2^{i-1}$; and repeating steps (4) and (5) until the judgement in step (4) is Yes; at that time, a node satisfying the preset condition in the i-th layer of grid is a seismic source point.

In order to achieve the above objective, the embodiments of the present application provide a system for positioning a seismic source in microseism monitoring, including:

a processor; and a storage configured to store computer program instructions which when being executed by the processor, perform the steps of:

acquiring a monitoring region and each observation point therein;

partitioning the monitoring region into N layers of grids according to a seismic source positioning accuracy, wherein a side length of a grid cell of an i-th layer of grid is $D/2^{i-1}$, i=1, . . . N, and D is an initial side length of the grid cell and not more than a double of a distance between the respective observation points;

searching all nodes in a first layer of grid to acquire a node satisfying a preset condition therefrom;

from i=2, determining and searching nodes satisfying a first preset requirement in the i-th layer of grid, to acquire a node satisfying the preset condition therefrom, until a search in an N-th layer of grid is completed, wherein a node satisfying the preset condition acquired in the N-th layer of grid is a seismic source point location; and the first preset requirement is falling within a circle centered on a node satisfying the preset condition in the (i−1)-th layer of grid with a radius of $\sqrt{2} \times D/2^{i-1}$.

In another aspect, the embodiments of the present application further provide a system for positioning a seismic source in microseism monitoring, including:

a processor; and a storage configured to store computer program instructions which when being executed by the processor, perform the steps of:

acquiring a monitoring region and each observation point therein;

partitioning the monitoring region into N layers of grids according to a seismic source positioning accuracy, wherein a side length of a grid cell of an i-th layer of grid is $D/2^{i-1}$, i=1, . . . N, and D is an initial side length of the grid cell and not more than a double of a distance between the respective observation points;

searching all nodes in a first layer of grid to acquire a node satisfying a preset condition therefrom;

when i=2, determining and searching nodes satisfying a first preset requirement in the i-th layer of grid, to acquire a node satisfying the preset condition therefrom, wherein the first preset requirement is falling within a circle centered on a node satisfying the preset condition in the (i−1)-th layer of grid with a radius of $\sqrt{2} \times D/2^{i-1}$;

from i=3, determining and searching nodes satisfying a second preset requirement in the i-th layer of grid, to acquire a node satisfying the preset condition therefrom, until a search in an N-th layer of grid is completed, wherein a node satisfying the preset condition acquired in the N-th layer of grid is a seismic source point location; and the second preset requirement is falling within a circle centered on a node satisfying the preset condition in the (i−2)-th layer of grid with a radius of $\sqrt{2} \times D/2^{i-2}$, and simultaneously falling within the circle centered on the node satisfying the preset condition in the (i−1)-th layer of grid with the radius of $\sqrt{2} \times D/2^{i-1}$.

In another aspect, the embodiments of the present application further provide a system for positioning a seismic source in microseism monitoring, including:

a processor; and a storage configured to store computer program instructions which when being executed by the processor, perform the steps of:

(1) acquiring a monitoring region and each observation point therein;

(2) performing a first layer of grid partitioning for the monitoring region according to a preset initial side length D of a grid cell, and searching all nodes therein to acquire a node satisfying a preset condition, wherein the initial side length is not more than a double of a distance between the respective observation points.

(3) judging whether the side length of a current grid cell satisfies a seismic source positioning accuracy, and if the judgement is No, from i=2, performing an i-th layer of grid partitioning for the monitoring region by taking the side length of the grid cell as $D/2^{i-1}$, wherein i=2, 3, 4 . . . ;

(4) searching nodes satisfying a first preset requirement in the i-th layer of grid, to acquire a node satisfying the preset condition therefrom, the first preset requirement being falling within a circle centered on a node satisfying the preset condition in the (i−1)-th layer of grid with a radius of $\sqrt{2} \times D/2^{i-1}$, and repeating steps (3) and (4) until the judgement in step (3) is Yes; at that time, a node satisfying the preset condition in the i-th layer of grid is a seismic source point.

In another aspect, the embodiments of the present application further provide a system for positioning a seismic source in microseism monitoring, including:

a processor; and a storage configured to store computer program instructions which when being executed by the processor, perform the steps of:

(1) acquiring a monitoring region and each observation point therein;

(2) performing a first layer of grid partitioning for the monitoring region according to a preset initial side length D of a grid cell, and searching all nodes therein to acquire a node satisfying a preset condition, wherein the initial side length is not more than a double of a distance between the respective observation points;

(3) performing a second layer of grid partitioning for the monitoring region by taking the side length of the grid cell as $D/2^{i-1}$, wherein i=2, and searching nodes satisfying a first preset requirement in the second layer of grid to acquire a node satisfying the preset condition therefrom; wherein the first preset requirement is falling within a circle centered on a node satisfying the preset condition in the (i−1)-th layer of grid with a radius of $\sqrt{2} \times D/2^{i-1}$;

(4) judging whether the side length of a current grid cell satisfies a seismic source positioning accuracy, and if the judgement is No, from i=3, performing an i-th layer of grid partitioning for the monitoring region by taking the side length of the grid cell as $D/2^{i-1}$, wherein i=3, 4 . . . ;

(5) searching nodes satisfying a second preset requirement in the i-th layer of grid, to acquire a node satisfying the preset condition therefrom, the second preset requirement being falling within a circle centered on a node satisfying the preset condition in the (i−2)-th layer of grid with a radius of $\sqrt{2} \times D/2^{i-2}$, and simultaneously falling within the circle centered on the node satisfying the preset condition in the (i−1)-th layer of grid with the radius of $\sqrt{2} \times D/2^{i-1}$; and repeating steps (4) and (5) until the judgement in step (4) is Yes; at that time, a node satisfying the preset condition in the i-th layer of grid is a seismic source point.

As can be seen from the above technical solutions provided by the embodiments of the present application, the embodiments of the present application partition the monitoring region into N layers of grids according to the seismic source positioning accuracy; in the node search process in a next layer of grid, it is only necessary to search those in the next layer of grid falling within a neighborhood circle centered on a grid node satisfying the preset condition determined in the previous layer of grid, and the search range is gradually narrowed; in any new search layer, it only needs to search 9 nodes, including the node satisfying the preset condition in the previous layer of grid, i.e., only 8 nodes require a search calculation in any new search layer, which realizes a small calculation amount for high-accuracy positioning.

DETAILED DESCRIPTION

In order that the objective, technical solutions, and advantages of the embodiments of the present application are clearer, the embodiments of the present application will be further described in detail as follows with reference to the embodiments and the drawings. Herein, the exemplary embodiments of the present application and the descriptions thereof just explain, rather than limiting, the embodiments of the present application.

Next, the implementations of the embodiments of the present application are further described in detail with reference to the drawings.

Figure 1:
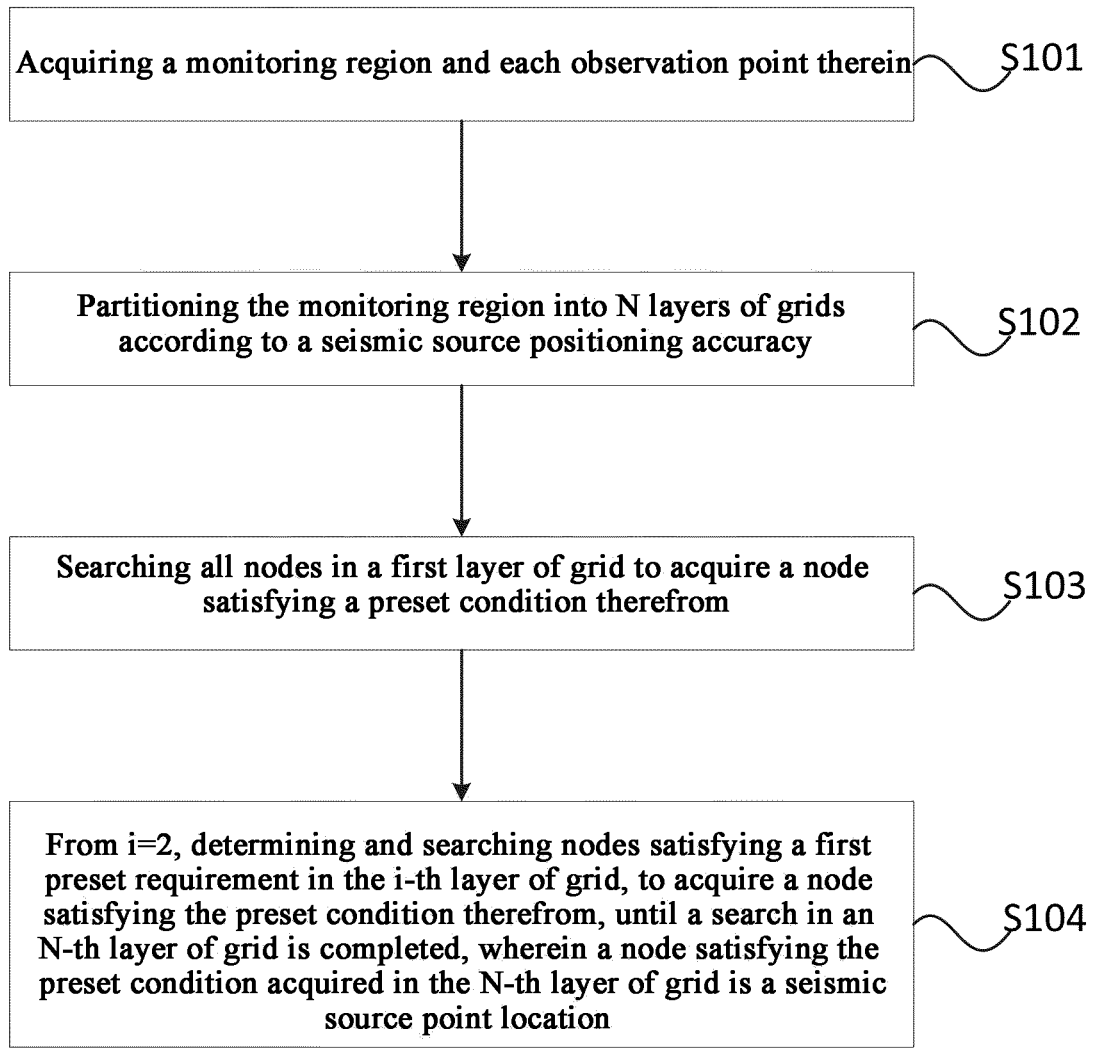
FIG. 1 illustrates a schematic flowchart of a method for positioning a seismic source in microseism monitoring according to an embodiment of the present application.

FIG. 1 illustrates a schematic flowchart of a method for positioning a seismic source in microseism monitoring. As illustrated in FIG. 1, a method for positioning a seismic source in microseism monitoring may include:

S101: acquiring a monitoring region and each observation point therein.

S102: partitioning the monitoring region into N layers of grids according to a seismic source positioning accuracy. In which, a side length of a grid cell of an i-th layer of grid is $D/2^{i-1}$, i=1, . . . N, and D is an initial side length of the grid cell and not more than a double of a distance between the respective observation points.

S103: searching all nodes in a first layer of grid to acquire a node satisfying a preset condition therefrom.

S104: from i=2, determining and searching nodes satisfying a first preset requirement in the i-th layer of grid, to acquire a node satisfying the preset condition therefrom, until a search in an N-th layer of grid is completed, wherein a node satisfying the preset condition acquired in the N-th layer of grid is a seismic source point location.

The first preset requirement is falling within a circle centered on a node satisfying the preset condition in the (i−1)-th layer of grid with a radius of $\sqrt{2} \times D/2^{i-1}$.

As can be seen from the flowchart of FIG. 1, the embodiment of the present application partitions the monitoring region into N layers of grids according to the seismic source positioning accuracy; in the node search process in a next layer of grid, it is only necessary to search those in the next layer of grid falling within a neighborhood circle centered on a grid node satisfying the preset condition determined in the previous layer of grid, and the search range is gradually narrowed; in any new search layer, it only needs to search 9 nodes, including the node satisfying the preset condition in the previous layer of grid, i.e., only 8 nodes require a search calculation in any new search layer, which realizes a small calculation amount for high-accuracy positioning.

In one embodiment of the present application, the seismic source positioning accuracy is P, and during the implementation of S102, the monitoring region is partitioned into N layers of grids according to the seismic source positioning accuracy, and the seismic source positioning accuracy and a layer number N of the N layers of grids satisfies the following equation:

$$P \geq D/2^{N-1} \text{ and } P < D/2^{N-2}$$

In the above embodiment, a grid partitioning is performed for the detection region according to the requirement of the seismic source positioning accuracy to obtain N layers of grids, which provides a basis for subsequent stepwise searches to determine the range of the seismic source.

In one embodiment of the present application, the node search is performed in the process as described in FIG. 1, and a total times OTimes of operations is:

$$\text{OTimes} = NGX \times NGY + 8 \times (N-1)$$

wherein NGX denotes the number of grid nodes in a horizontal direction of the first layer of grid; and NGY denotes the number of grid nodes in a vertical direction of the first layer of grid.

As can be seen from the above embodiment, only 8 nodes require a search calculation in any new layer of grid, while the positioning accuracy is greatly increased.

In one embodiment of the present application, the monitoring height is 150 meters, the monitoring length is 2000 meters, the distance between the observation points is 20 meters, and the requirement of the seismic source positioning accuracy is 1 meter. N layers of grids are partitioned, and the initial side length of the grid cell is selected as 20 meters. As can be seen from the equation between the seismic source positioning accuracy and the grid layer number N, when N=6, $20/2^{6-1}=0.625$ meter<1 meter, which satisfies the accuracy requirement.

In the searches in 6 layers of grids, totally nodes need to be calculated, and when the existing positioning method based on forward modeling is adopted while the accuracy is 1 meter, 300,000 grid nodes should be searched. As compared with the existing method, the binary grid search method adopted in this embodiment increases the accuracy by 1.6 times and reduces the calculation amount by 357 times.

As can be seen from the above embodiment, in any new search layer, it only needs to search 9 nodes, including the node satisfying the preset condition in the previous layer of grid, i.e., only 8 nodes require a search calculation in any new search layer, which realizes a small calculation amount for high-accuracy positioning.

Figure 2:
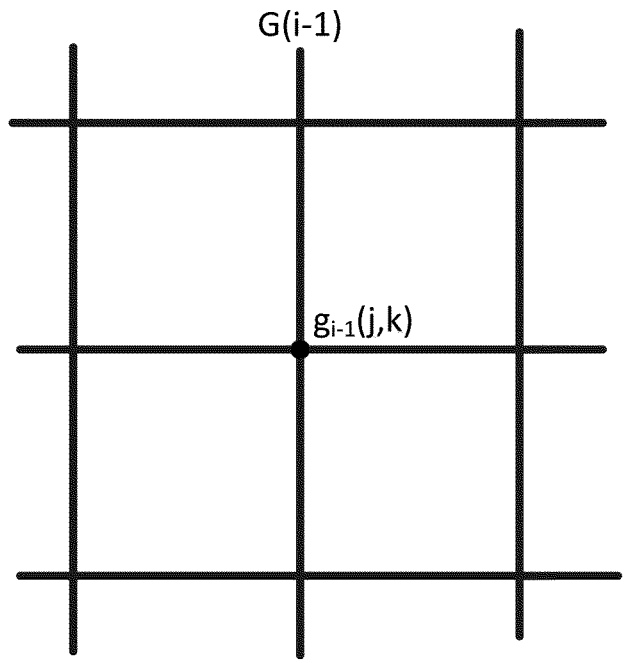
FIG. 2 illustrates a schematic diagram of a node search result in a grid G(i−1) according to an embodiment of the present application.
Figure 3:
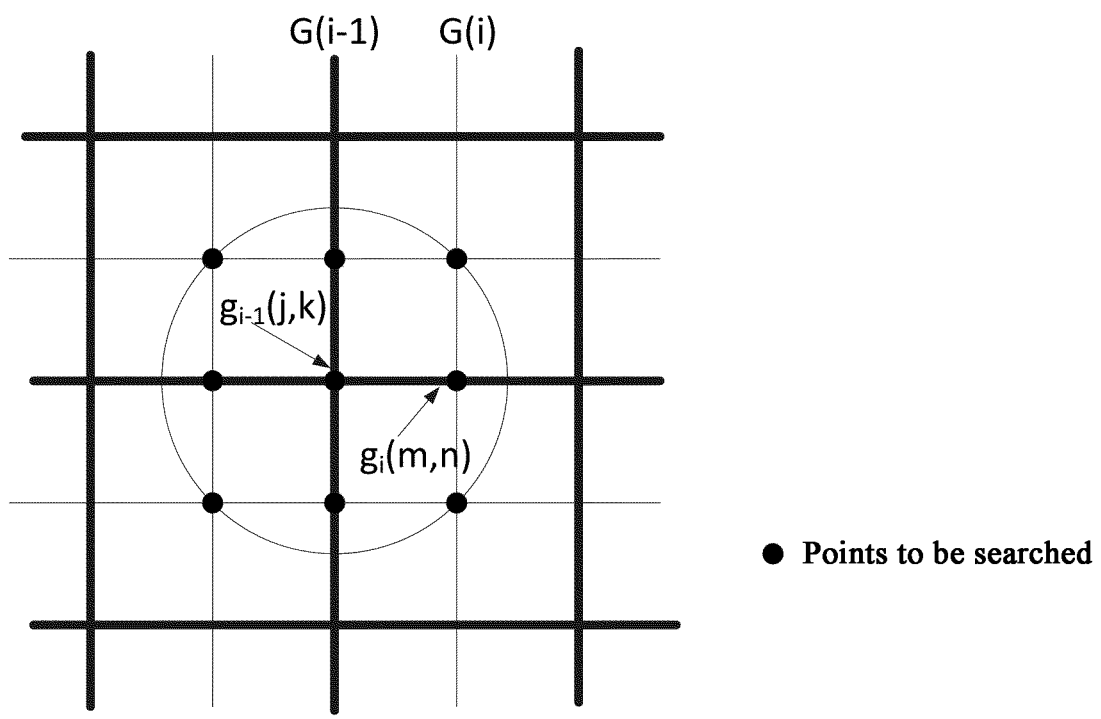
FIG. 3 illustrates a schematic diagram of searching nodes in a grid G(i) according to an embodiment of the present application.

In one embodiment of the present application, according to the seismic source positioning accuracy, the monitoring region is partitioned into N layers of grids denoted as G(1) . . . G(N), respectively, wherein a side length of a grid cell of the i-th layer of grid is $D/2^{i-1}$, and i=1, . . . N. A node satisfying the preset condition in a grid G(i-1) is denoted as $g_{i-1}$ (j, k), as illustrated in FIG. 2. Nodes satisfying the first preset requirement in the i-th layer of grid are determined and searched, such as the points to be searched illustrated in FIG. 3 (including the node $g_{i-1}$ (j, k)), and a node therein satisfying the preset condition is acquired and denoted as $g_i$ (m, n), and so on, until the search in the N-th layer of grid is completed, so as to determine a final seismic source point location.

The embodiment of the present application partitions the monitoring region into N layers of grids according to the seismic source positioning accuracy; in the node search process in a next layer of grid, it is only necessary to search those in the next layer of grid falling within a neighborhood circle centered on a grid node satisfying the preset condition determined in the previous layer of grid, and the search range is gradually narrowed; in any new search layer, it only needs to search 9 nodes, including the node satisfying the preset condition in the previous layer of grid, i.e., only 8 nodes require a search calculation in any new search layer, which realizes a small calculation amount for high-accuracy positioning.

In one embodiment of the present application, the preset condition is that the current node has a maximum energy among all nodes within a search range. The process of calculating the node energy may include:

(1) obtaining a medium velocity by acoustic logging, and employing a ray tracing method for calculations point by point to obtain a theoretical propagation path and a forward first arrival travel time from each grid node to a respective observation point;

(2) after obtaining the forward first arrival time from each grid node to a respective observation point, extracting direct wave energy superposition from seismic records according to a forward first arrival time schedule to obtain energy at each grid point.

The node close to the actual seismic source point location should have larger energy than other nodes. In each search process of this embodiment, a node with the maximum energy is acquired, so that the actual seismic source point location can be gradually approached to.

In one embodiment of the present application, before step S103, the method further includes picking up an actual first arrival time of a microseism.

Correspondingly, the preset condition is that the current node has a minimum time difference among all nodes within the search range, and the time difference is between forward first arrival time from a node to a respective monitoring point in the monitoring region and the actual first arrival time.

In one embodiment of the present application, the process of calculating the time difference between the forward first arrival time and the actual first arrival time from the node to a respective monitoring point in the monitoring region may include:

(1) picking up the actual first arrival time of a micro seismic signal to a respective observation point as $T_{0j}$, wherein j=1, 2 . . . n, and n denotes the number of the observation points.

(2) scanning the grid node to acquire the forward first arrival time $T_j$ thereof to a respective monitoring point.

(3) calculating a time difference ΔT of each node:

$$\Delta T = \sum_{j}^{n} (T_j - T_{0j})^2$$

wherein n denotes the number of the observation points.

The time difference decreases as the forward first arrival time of the node close to the seismic source point to a respective observation point approaches to the actual first arrival time. In each search process of this embodiment, the actual seismic source point location can be gradually approached to by acquiring a node having the minimum time difference.

Figure 4:
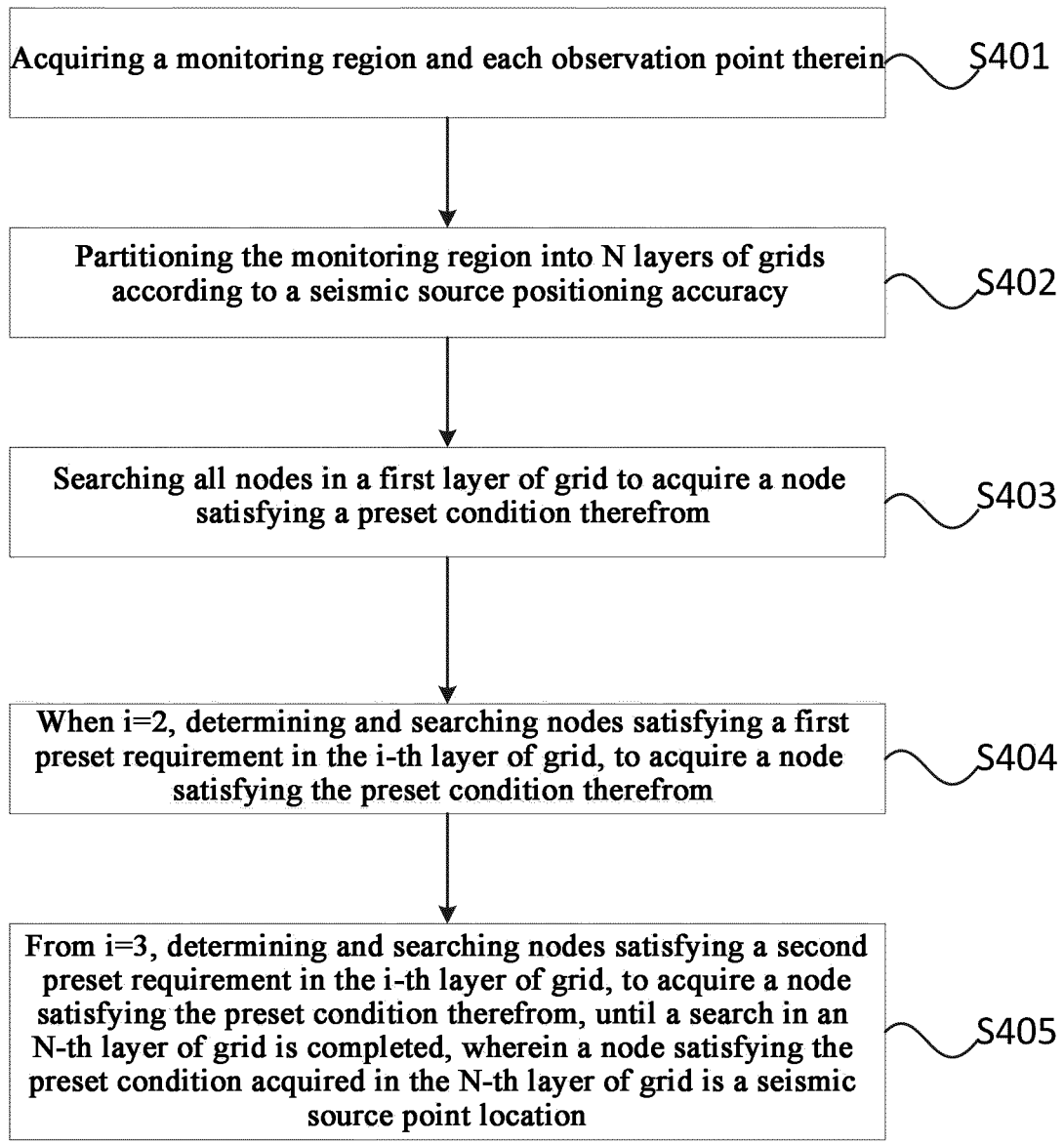
FIG. 4 illustrates a schematic flowchart of another method for positioning a seismic source in microseism monitoring according to an embodiment of the present application.

FIG. 4 is a schematic flowchart of another method for positioning a seismic source in microseism monitoring according to an embodiment of the present application. As illustrated in FIG. 4, another method for positioning a seismic source in microseism monitoring may include:

S401: acquiring a monitoring region and each observation point therein.

S402: partitioning the monitoring region into N layers of grids according to a seismic source positioning accuracy. In which, a side length of a grid cell of an i-th layer of grid is $D/2^{i-1}$, i=1, ... N, and D is an initial side length of the grid cell and not more than a double of a distance between the respective observation points.

S403: searching all nodes in a first layer of grid to acquire a node satisfying a preset condition therefrom.

S404: when i=2, determining and searching nodes satisfying a first preset requirement in the i-th layer of grid, to acquire a node satisfying the preset condition therefrom. The first preset requirement is falling within a circle centered on a node satisfying the preset condition in the (i−1)-th layer of grid with a radius of $\sqrt{2} \times D/2^{i-1}$.

S405: from i=3, determining and searching nodes satisfying a second preset requirement in the i-th layer of grid, to acquire a node satisfying the preset condition therefrom, until a search in an N-th layer of grid is completed, wherein a node satisfying the preset condition acquired in the N-th layer of grid is a seismic source point location.

The second preset requirement is falling within a circle centered on a node satisfying the preset condition in the (i−2)-th layer of grid with a radius of $\sqrt{2} \times D/2^{i-2}$, and simultaneously falling within the circle centered on the node satisfying the preset condition in the (i−1)-th layer of grid with the radius of $\sqrt{2} \times D/2^{i-1}$.

As can be seen from the flowchart of FIG. 4, when i>2, in the search process, this embodiment simultaneously considers a neighborhood of the node satisfying the preset condition in the (i−1)-th layer and a neighborhood of the node satisfying the preset condition in the (i−2)-th layer, thereby further reducing the calculation amount and increasing the search speed.

In one embodiment of the present application, according to the seismic source positioning accuracy, the monitoring region is partitioned into N layers of grids denoted as G(1) ... G(N), respectively, wherein a side length of a grid cell of the i-th layer of grid is $D/2^{i-1}$, and i=1, ... N.

When i>2, the node satisfying the preset condition in the (i−2)-th layer of grid G(i−2) is denoted as gi−2 (j, k); when the node satisfying the preset condition in the (i−1)-th layer of grid G(i−1) is to be determined, all nodes in G(i−1) falling within the circle centered on $g_{i-2}$ (j, k) in G(i−1) with the radius of $\sqrt{2} \times D/2^{i-1}$ (as indicated by the black solid dots in FIG. 5) are searched, and finally the node satisfying the preset condition in G(i−1) is obtained and denoted as $g_{i-1}$(m, n).

Figure 5:
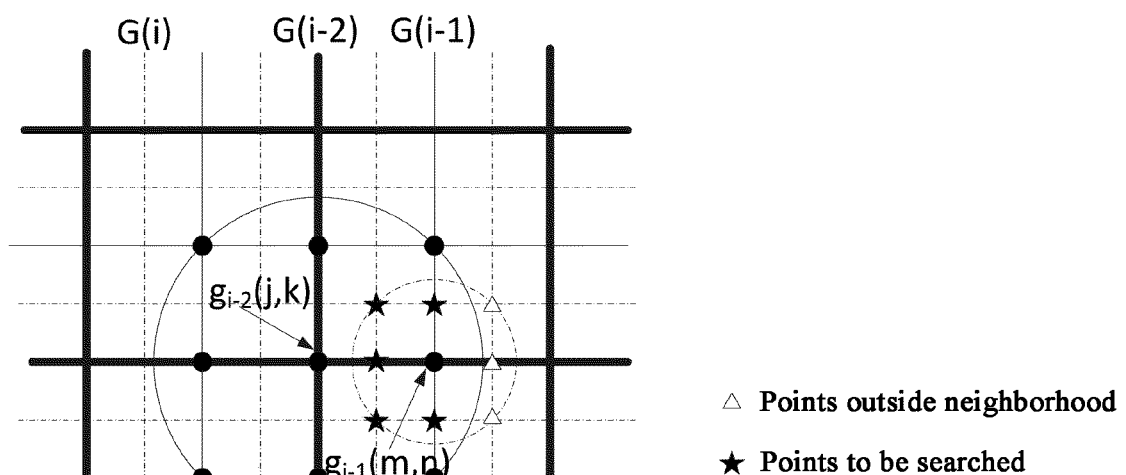
FIG. 5 illustrates a schematic diagram of searching nodes in a grid G(i) considering two layers of neighborhoods according to an embodiment of the present application.

When the node satisfying the preset condition in the i-th layer of grid is to be further determined, it only needs to search the nodes in G(i) falling within the neighborhood circle centered on the node satisfying the preset condition in the (i−1)-th layer of grid with the radius of $\sqrt{2} \times D/2^{i-1}$, and simultaneously falling within the circle centered on the node satisfying the preset condition in the (i−2)-th layer of grid with the radius of $\sqrt{2} \times D/2^{i-2}$, as indicated by the solid five-pointed stars in FIG. 5. It is unnecessary to search the nodes just falling within a neighborhood circle centered on $g_{i-1}$ (m, n) with a radius of $\sqrt{2} \times D/2^{i-1}$, as indicated by the triangles in FIG. 5.

When i>2, in the search process, this embodiment simultaneously considers a neighborhood of the node satisfying the preset condition in the (i−1)-th layer and a neighborhood of the node satisfying the preset condition in the (i−2)-th layer, thereby further reducing the calculation amount and increasing the search speed.

Figure 6:
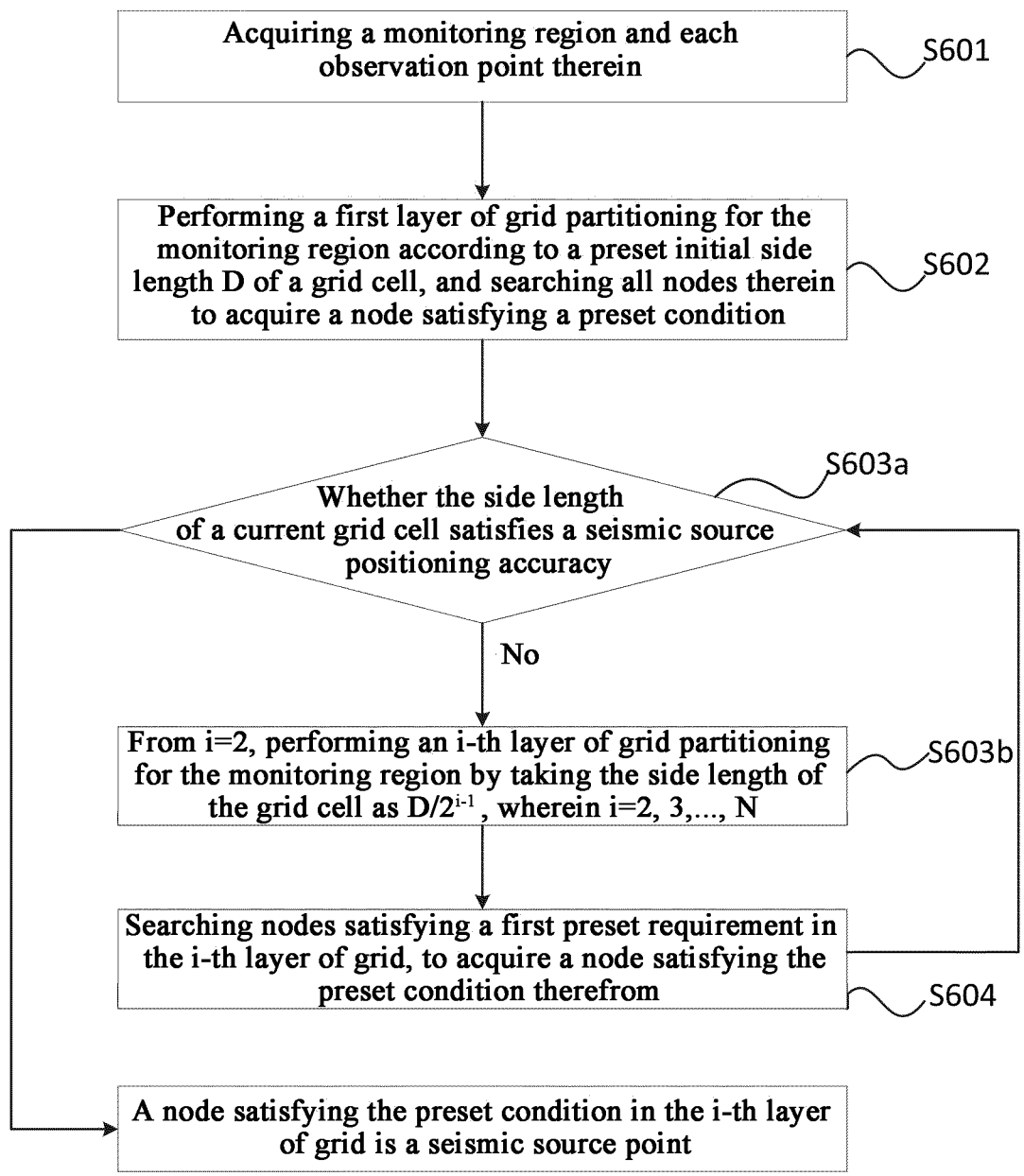
FIG. 6 illustrates a schematic flowchart of still another method for positioning a seismic source in microseism monitoring according to an embodiment of the present application.

In one embodiment of the present application, FIG. 6 illustrates a schematic flowchart of still another method for positioning a seismic source in microseism monitoring, including:

S601: acquiring a monitoring region and each observation point therein.

S602: performing a first layer of grid partitioning for the monitoring region according to a preset initial side length D of a grid cell, and searching all nodes therein to acquire a node satisfying a preset condition. The initial side length is not more than a double of a distance between the respective observation points.

S603a: judging whether the side length of a current grid cell satisfies a seismic source positioning accuracy, and if the judgement is No, performing step S603b, i.e., from i=2, performing an i-th layer of grid partitioning for the monitoring region by taking the side length of the grid cell as $D/2^{i-1}$, wherein i=2, 3, 4 ....

S604: searching nodes satisfying a first preset requirement in the i-th layer of grid, to acquire a node satisfying the preset condition therefrom, and repeating steps S603a to S604 until the judgement in step S603a is Yes. At that time, a node satisfying the preset condition in the i-th layer of grid is a seismic source point.

The first preset requirement is falling within a circle centered on a node satisfying the preset condition in the (i−1)-th layer of grid with a radius of $\sqrt{2} \times D/2^{i-1}$.

This embodiment performs a grid partitioning for the monitoring region based on the grid cells from large to small, and searches for the node satisfying the preset condition in each layer of grid. In the search process, it is only necessary to search the nodes in the next layer of grid falling within a neighborhood circle centered on a grid node satisfying the preset condition determined in the previous layer of grid, and the search range is gradually narrowed; in any new search layer, it only needs to search 9 nodes, including the node satisfying the preset condition in the previous layer of grid, i.e., only 8 nodes require a search calculation in any new search layer, which realizes a small calculation amount for high-accuracy positioning.

Figure 7:
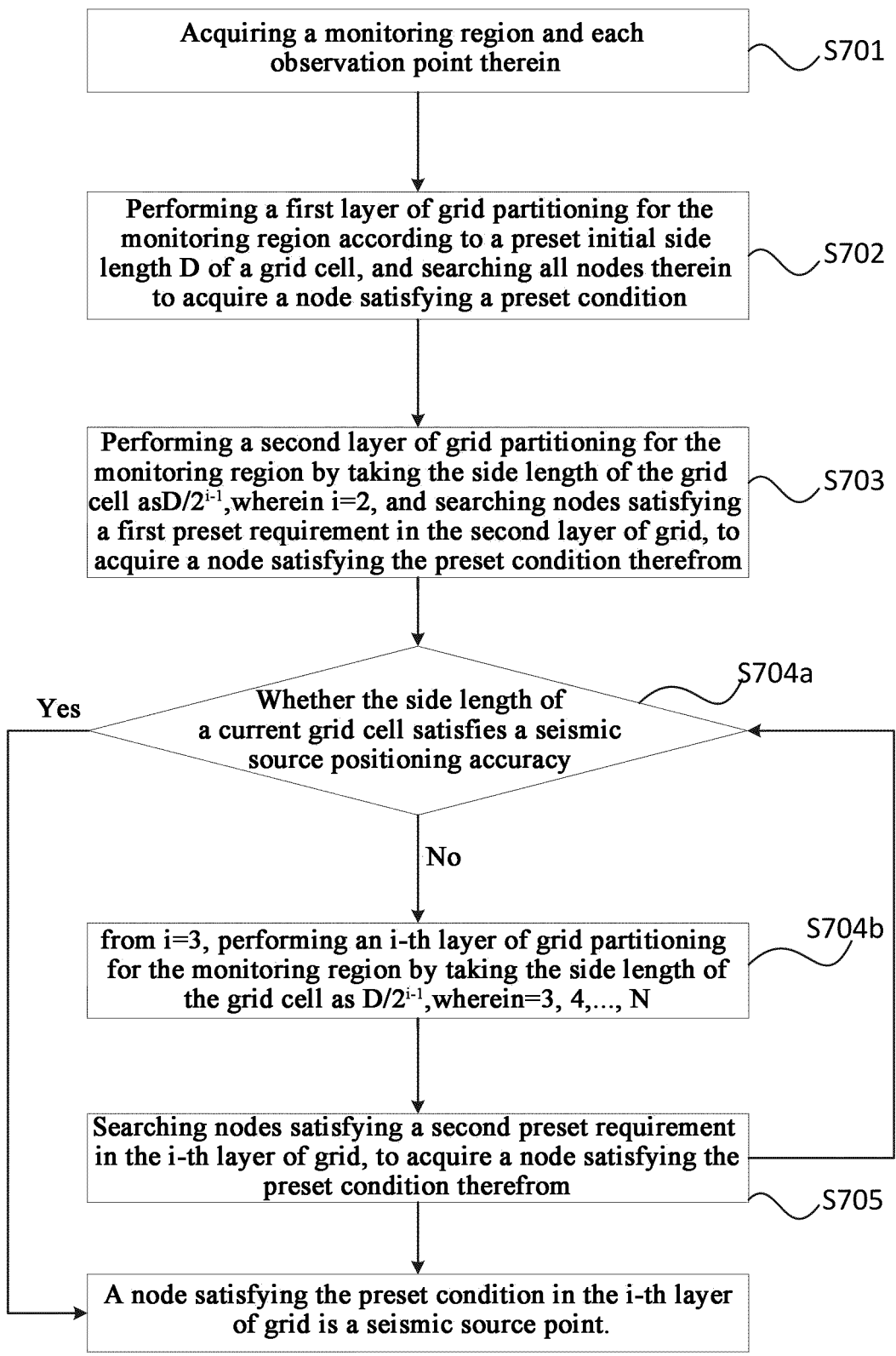
FIG. 7 illustrates a schematic flowchart of yet another method for positioning a seismic source in microseism monitoring according to an embodiment of the present application.

In one embodiment of the present application, FIG. 7 illustrates a schematic flowchart of yet another method for positioning a seismic source in microseism monitoring. At that time, the yet another method for positioning a seismic source in microseism monitoring may include:

S701: acquiring a monitoring region and each observation point therein.

S702: performing a first layer of grid partitioning for the monitoring region according to a preset initial side length D of a grid cell, and searching all nodes therein to acquire a node satisfying a preset condition. The initial side length is not more than a double of a distance between the respective observation points.

S703: performing a second layer of grid partitioning for the monitoring region by taking the side length of the grid cell as $D/2^{i-1}$, wherein i=2, and searching nodes satisfying a first preset requirement in the second layer of grid, to acquire a node satisfying the preset condition therefrom. The first preset requirement is falling within a circle centered on a node satisfying the preset condition in the (i−1)-th layer of grid with a radius of $\sqrt{2} \times D/2^{i-1}$.

S704a: judging whether the side length of a current grid cell satisfies a seismic source positioning accuracy, and if the judgement is No, performing step S704b, i.e., from i=3, performing an i-th layer of grid partitioning for the monitoring region by taking the side length of the grid cell as $D/2^{i-1}$, wherein i=3, 4 ....

S705: searching nodes satisfying a second preset requirement in the i-th layer of grid, to acquire a node satisfying the preset condition therefrom, and repeating steps S704a to S705 until the judgement in step S704a is Yes. At that time, a node satisfying the preset condition in the i-th layer of grid is a seismic source point.

The second preset requirement is falling within a circle centered on a node satisfying the preset condition in the (i−2)-th layer of grid with a radius of $\sqrt{2} \times D/2^{i-2}$, and simultaneously falling within the circle centered on the node satisfying the preset condition in the (i−1)-th layer of grid with the radius of $\sqrt{2} \times D/2^{i-1}$.

This embodiment performs a grid partitioning for the monitoring region based on the grid cells from large to small, and searches for the node satisfying the preset condition in each layer of grid. When i>2, in the search process, this embodiment simultaneously considers a neighborhood of the node having the maximum energy in the (i−1)-th layer and a neighborhood of the node having the maximum energy in the (i−2)-th layer, thereby further reducing the calculation amount and increasing the search speed.

The embodiments of the present application further provide a system for positioning a seismic source in microseism monitoring, as described below. Since the principle of the system to solve the problem is similar to that of the method for positioning a seismic source in microseism monitoring, the implementation of the system may refer to that of the method for positioning a seismic source in microseism monitoring, and the repeated contents are omitted herein.

Figure 8:
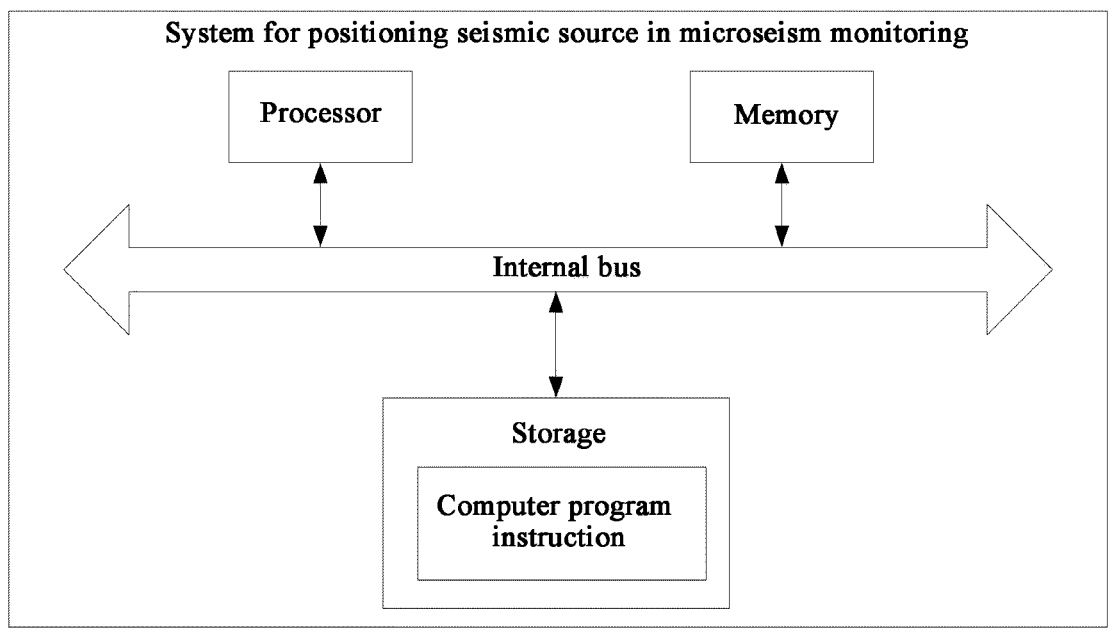
FIG. 8 illustrates a schematic structural diagram of a system for positioning a seismic source in microseism monitoring according to an embodiment of the present application.

As illustrated in FIG. 8, the system of this embodiment of the present application may include a processor, an internal bus, a storage, and a memory at the hardware level, and of course may further include any other service-required hardware. The processor reads corresponding computer program instruction from the storage and inputs it into the memory for execution. Of course, in addition to the software implementation, the present application does not exclude any other implementation, such as logic device, software and hardware combination, and the like. That is to say, the execution subject of the following processing flow is not limited to each logical unit, and it also may be hardware or a logic device. In which, when being executed by the processor, the computer program instructions perform the steps of:

acquiring a monitoring region and each observation point therein;

partitioning the monitoring region into N layers of grids according to a seismic source positioning accuracy, wherein a side length of a grid cell of an i-th layer of grid is $D/2^{i-1}$, i=1, . . . N, and D is an initial side length of the grid cell and not more than a double of a distance between the respective observation points;

searching all nodes in a first layer of grid to acquire a node satisfying a preset condition therefrom;

from i=2, determining and searching nodes satisfying a first preset requirement in the i-th layer of grid, to acquire a node satisfying the preset condition therefrom, until a search in an N-th layer of grid is completed, wherein a node satisfying the preset condition acquired in the N-th layer of grid is a seismic source point location; and the first preset requirement is falling within a circle centered on a node satisfying the preset condition in the (i−1)-th layer of grid with a radius of $\sqrt{2} \times D/2^{i-1}$.

For the detail of the execution of the above steps, please refer to the method for positioning a seismic source in microseism monitoring as illustrated in FIG. 1, which is omitted herein.

As can be seen from the above system, the embodiment of the present application partitions the monitoring region into N layers of grids according to the seismic source positioning accuracy; in the node search process in a next layer of grid, it is only necessary to search those in the next layer of grid falling within a neighborhood circle centered on a grid node satisfying the preset condition determined in the previous layer of grid, and the search range is gradually narrowed; in any new search layer, it only needs to search 9 nodes, including the node satisfying the preset condition in the previous layer of grid, i.e., only 8 nodes require a search calculation in any new search layer, which realizes a small calculation amount for high-accuracy positioning.

In another embodiment of the present application for a system for positioning a seismic source in a microseism monitoring system, when being executed by the processor, the computer program instructions in the storage illustrated in FIG. 8 perform the steps of:

acquiring a monitoring region and each observation point therein;

partitioning the monitoring region into N layers of grids according to a seismic source positioning accuracy, wherein a side length of a grid cell of an i-th layer of grid is $D/2^{i-1}$, i=1, . . . N, and D is an initial side length of the grid cell and not more than a double of a distance between the respective observation points;

searching all nodes in a first layer of grid to acquire a node satisfying a preset condition therefrom;

when i=2, determining and searching nodes satisfying a first preset requirement in the i-th layer of grid, to acquire a node satisfying the preset condition therefrom; the first preset requirement is falling within a circle centered on a node satisfying the preset condition in the (i−1)-th layer of grid with a radius of $\sqrt{2} \times D/2^{i-1}$;

from i=3, determining and searching nodes satisfying a second preset requirement in the i-th layer of grid, to acquire a node satisfying the preset condition therefrom, until a search in an N-th layer of grid is completed, wherein a node satisfying the preset condition acquired in the N-th layer of grid is a seismic source point location; the second preset requirement is falling within a circle centered on a node satisfying the preset condition in the (i−2)-th layer of grid with a radius of $\sqrt{2} \times D/2^{i-2}$, and simultaneously falling within the circle centered on the node satisfying the preset condition in the (i−1)-th layer of grid with the radius of $\sqrt{2} \times D/2^{i-1}$.

For the detail of the execution of the above steps, please refer to the method for positioning a seismic source in microseism monitoring as illustrated in FIG. 4, which is omitted herein.

As can be seen from the above system, the embodiment of the present application partitions the monitoring region into N layers of grids according to the seismic source positioning accuracy; in the node search process in a next layer of grid, it is only necessary to search those in the next layer of grid falling within a neighborhood circle centered on a grid node satisfying the preset condition determined in the previous layer of grid, and the search range is gradually narrowed; in any new search layer, it only needs to search 9 nodes, including the node satisfying the preset condition in the previous layer of grid, i.e., only 8 nodes require a search calculation in any new search layer, which realizes a small calculation amount for high-accuracy positioning.

In another embodiment of the present application for a system for positioning a seismic source in a microseism monitoring system, when being executed by the processor, the computer program instructions in the storage illustrated in FIG. 8 may further perform the steps of:

(1) acquiring a monitoring region and each observation point therein;

(2) performing a first layer of grid partitioning for the monitoring region according to a preset initial side length D of a grid cell, and searching all nodes therein to acquire a node satisfying a preset condition, wherein the initial side length is not more than a double of a distance between the respective observation points.

(3) judging whether the side length of a current grid cell satisfies a seismic source positioning accuracy, and if the judgement is No, from i=2, performing an i-th layer of grid partitioning for the monitoring region by taking the side length of the grid cell as $D/2^{i-1}$, wherein i=2, 3, 4 . . . ;

(4) searching nodes satisfying a first preset requirement in the i-th layer of grid, to acquire a node satisfying the preset condition therefrom, and repeating steps (3) and (4) until the judgement in step (3) is Yes; at that time, a node satisfying the preset condition in the i-th layer of grid is a seismic source point; the first preset requirement is falling within a circle centered on a node satisfying the preset condition in the (i−1)-th layer of grid with a radius of $\sqrt{2} \times D/2^{i-1}$.

For the detail of the execution of the above steps, please refer to the method for positioning a seismic source in microseism monitoring as illustrated in FIG. 6, which is omitted herein.

As can be seen from the above system, in the node search process in a next layer of grid, the embodiment of the present application only searches the nodes in the next layer of grid falling within a neighborhood circle centered on a grid node satisfying the preset condition determined in the previous layer of grid, and the search range is gradually narrowed; in any new search layer, it only needs to search 9 nodes, including the node satisfying the preset condition in the previous layer of grid, i.e., only 8 nodes require a search calculation in any new search layer, which realizes a small calculation amount for high-accuracy positioning.

In another embodiment of the present application for a system for positioning a seismic source in a microseism monitoring system, when being executed by the processor, the computer program instructions in the storage illustrated in FIG. 8 may further perform the steps of:

(1) acquiring a monitoring region and each observation point therein;

(2) performing a first layer of grid partitioning for the monitoring region according to a preset initial side length D of a grid cell, and searching all nodes therein to acquire a node satisfying a preset condition, wherein the initial side length is not more than a double of a distance between the respective observation points;

(3) performing a second layer of grid partitioning for the monitoring region by taking the side length of the grid cell as $D/2^{i-1}$, wherein i=2, and searching nodes satisfying a first preset requirement in the second layer of grid, to acquire a node satisfying the preset condition therefrom; wherein the first preset requirement is falling within a circle centered on a node satisfying the preset condition in the (i−1)-th layer of grid with a radius of $\sqrt{2} \times D/2^{i-1}$;

(4) judging whether the side length of a current grid cell satisfies a seismic source positioning accuracy, and if the judgement is No, from i=3, performing an i-th layer of grid partitioning for the monitoring region by taking the side length of the grid cell as $D/2^{i-1}$, wherein i=3, 4 . . . ;

(5) searching nodes satisfying a second preset requirement in the i-th layer of grid, to acquire a node satisfying the preset condition therefrom, and repeating steps (4) and (5) until the judgement in step (4) is Yes; at that time, a node satisfying the preset condition in the i-th layer of grid is a seismic source point; the second preset requirement is falling within a circle centered on a node satisfying the preset condition in the (i−2)-th layer of grid with a radius of $\sqrt{2} \times D/2^{i-2}$, and simultaneously falling within the circle centered on the node satisfying the preset condition in the (i−1)-th layer of grid with the radius of $\sqrt{2} \times D/2^{i-1}$.

For the detail of the execution of the above steps, please refer to the method for positioning a seismic source in microseism monitoring as illustrated in FIG. 7, which is omitted herein.

As can be seen from the above system, in the node search process in a next layer of grid, the embodiment of the present application only searches the nodes in the next layer of grid falling within a neighborhood circle centered on a grid node satisfying the preset condition determined in the previous layer of grid, and the search range is gradually narrowed; in any new search layer, it only needs to search 9 nodes, including the node satisfying the preset condition in the previous layer of grid, i.e., only 8 nodes require a search calculation in any new search layer, which realizes a small calculation amount for high-accuracy positioning.

Although the processes described above includes a plurality of operations occurring in a particular order, it should be clearly understood that those processes may include more or less operations which may be performed sequentially or in parallel (e.g., using a parallel processor or a multi-threaded environment).

For the convenience of description, the above systems are described through their functions respectively. Of course, those functions may be realized in one or more software and/or hardware during implementation of the present application.

Those skilled in the art should appreciate that any embodiment of the present disclosure can be provided as a method, a system or a computer program product. Therefore, the present disclosure can take the form of a full hardware embodiment, a full software embodiment, or an embodiment combining software and hardware. Moreover, the present disclosure can take the form of a computer program product implemented on one or more computer usable storage mediums (including, but not limited to, a magnetic disc memory, CD-ROM, optical storage, etc.) containing therein computer usable program codes.

The present disclosure is described with reference to a flow diagram and/or a block diagram of the method, apparatus (system) and computer program product according to the embodiments of the present disclosure. It shall be appreciated that each flow and/or block in the flow diagram and/or the block diagram and a combination of flows and/or blocks in the flow diagram and/or the block diagram can be realized by computer program instructions. Those computer program instructions can be provided to a general computer, a dedicated computer, an embedded processor or a processor of other programmable data processing device to produce a machine, so that the instructions executed by the processor of the computer or other programmable data processing device produce means for realizing specified functions in one or more flows in the flow diagram and/or one or more blocks in the block diagram.

These computer program instructions may also be stored in a computer readable memory capable of guiding the computer or other programmable data processing devices to work in a particular manner, so that the instructions stored in the computer readable memory can produce manufacture articles including an instructing device which realizes function(s) specified in one or more flows in the flow diagram and/or one or more blocks in the block diagram.

These computer program instructions may also be loaded onto the computer or other programmable data processing devices, so that a series of operation steps are performed on the computer or other programmable data processing devices to produce a processing realized by the computer, thus the instructions executed on the computer or other programmable devices provide step(s) for realizing function (s) specified in one or more flows in the flow diagram and/or one or more blocks in the block diagram.

In a typical configuration, the computing device includes one or more processors (CPUs), an input/output interface, a network interface and a memory.

The memory may have the form of a volatile memory, a Random-Access Memory (RAM) and/or a nonvolatile memory such as Read-Only Memory (ROM) or a flash RAM, etc. among the computer readable medium. The memory is an example of the computer readable medium.

The computer-readable medium includes permanent and non-permanent, removable and non-removable media, which can realize the information storage in any method or technique. The information can be computer readable instructions, data structures, program modules or other data. An example of the computer storage medium includes, but not limited to, a phase change memory (PRAM), a static random access memory (SRAM), a dynamic random access memory (DRAM), other types of random access memory (RAM), a read-only memory (ROM), an electrically-erasable programmable read-only memory (EEPROM), a flash memory or other memory techniques, a compact disk read only memory (CD-ROM), a digital versatile disc (DVD) or other optical storages, magnetic cassette tapes, magnetic diskettes or other magnetic storage device or any other non-transmission medium, which can be used for the storage of information accessible to a computing device. According to the definitions herein, the computer readable medium does not include any temporary computer readable media (transitory media), such as modulated data signal and carrier wave.

Further to be noted, the term "comprise", "include" or any other variant intends to cover the non-exclusive inclusions, so that a process, a method, a commodity or a device comprising a series of elements comprise not only those elements, but also other elements not explicitly listed, or further comprise inherent elements of such process, method, commodity or device. In a case where there is no further limitation, the elements defined by a sentence "comprising a . . . " do not exclude other identical elements existing in the process, method, commodity or device comprising the elements.

Those skilled in the art should appreciate that any embodiment of the present application can be provided as a method, a system or a computer program product. Therefore, the present application can take the form of a full hardware embodiment, a full software embodiment, or an embodiment combining software and hardware. Moreover, the present disclosure can take the form of a computer program product implemented on one or more computer usable storage mediums (including, but not limited to, a magnetic disc memory, CD-ROM, optical storage, etc.) containing therein computer usable program codes.

The present application may be described in the general context of computer executable instructions executed by the computer, e.g., the program module. In general, the program module includes routine, program, object, component, data structure, etc. executing a particular task or realizing a particular abstract data type. The present application may also be put into practice in the distributed computing environments where tasks are executed by remote processing devices connected through a communication network. In the distributed computing environments, the program modules may be located in the local and remote computer storage medium including the storage device.

The embodiments herein are all described in a progressive manner, and the same or similar portions of the embodiments can refer to each other. Each embodiment lays an emphasis on its distinctions from other embodiments. In particular, the system embodiment is simply described since it is substantially similar to the method embodiment, and please refer to the descriptions of the method embodiment for the relevant portion.

The above descriptions are just preferred embodiments of the present application, rather than limitations to the present application. For a person skilled in the art, the present application is intended to cover any amendment or variation. Any amendment, equivalent substitution, improvement, etc. made under the spirit and principle of the present application shall fall within the scope of the claims of the present application.

What is claimed is:

1. A method for positioning a seismic source in microseism monitoring, comprising the steps of:
    acquiring a monitoring region and each observation point therein;
    partitioning the monitoring region into N layers of grids according to a seismic source positioning accuracy, wherein a side length of a grid cell of an i-th layer of grid is $D/2^{i-1}$, i=1, N, and D is an initial side length of the grid cell and not more than a double of a distance between the respective observation points;
    searching all nodes in a first layer of grid to acquire a node satisfying a preset condition therefrom;
    from i=2, determining and searching nodes satisfying a first preset requirement in the i-th layer of grid, to acquire a node satisfying the preset condition therefrom, until a search in an N-th layer of grid is completed, wherein the first preset requirement is falling within a circle centered on a node satisfying the preset condition in the (i-1)-th layer of grid with a radius of $\sqrt{2} \times D/2^{i-1}$; and
    determining a node satisfying the preset condition among the nodes acquired in the N-th layer of grid as a seismic source point location of the microseism,
    wherein the method further comprises:
    determining, by an acoustic logging well, a forward first arrival time from each node to the respective observation point, and
    wherein said determining a node satisfying the preset condition is determined at least based on the forward first arrival time.

2. The method according to claim 1, wherein the seismic source positioning accuracy and a layer number N of the N layers of grids satisfy the following equation:

$$P \geq D/2^{N-1} \text{ and } P < D/2^{N-2}$$

wherein P denotes the seismic source positioning accuracy.

3. The method according to claim 1, wherein the preset condition is that a current node has a maximum energy among all nodes within a search range.

4. The method according to claim 1, wherein before searching all nodes in a first layer of grid to acquire a node satisfying a preset condition therefrom, the method further comprises:
    picking up an actual first arrival time of a microseism, correspondingly, the preset condition is that a current node has a minimum time difference among all nodes within a search range, and the time difference is a time difference between the forward first arrival time and the actual first arrival time.

5. A non-transitory computer readable storage medium storing a method according to claim 1 for controlling a computer.

6. A method for positioning a seismic source in microseism monitoring, comprising the steps of:

acquiring a monitoring region and each observation point therein;

partitioning the monitoring region into N layers of grids according to a seismic source positioning accuracy, wherein a side length of a grid cell of an i-th layer of grid is $D/2^{i-1}$, i=1, . . . N, and D is an initial side length of the grid cell and not more than a double of a distance between the respective observation points;

searching all nodes in a first layer of grid to acquire a node satisfying a preset condition therefrom;

when i=2, determining and searching nodes satisfying a first preset requirement in the i-th layer of grid, to acquire a node satisfying the preset condition therefrom, wherein the first preset requirement is falling within a circle centered on a node satisfying the preset condition in the (i-1)-th layer of grid with a radius of $\sqrt{2}\times D/2^{i-1}$;

from i=3, determining and searching nodes satisfying a second preset requirement in the i-th layer of grid, to acquire a node satisfying the preset condition therefrom, until a search in an N-th layer of grid is completed, wherein the second preset requirement is falling within a circle centered on a node satisfying the preset condition in the (i-2)-th layer of grid with a radius of $\sqrt{2}\times D/2^{i-2}$, and simultaneously falling within the circle centered on the node satisfying the preset condition in the (i-1)-th layer of grid with the radius of $\sqrt{2}\times D/2^{i-1}$; and determining a node satisfying the preset condition among the nodes acquired in the N-th layer of grid as a seismic source point location of the microseism, wherein the method further comprises:

determining, by an acoustic logging well, a forward first arrival time from each node to the respective observation point, and wherein said determining a node satisfying the preset condition, is determined at least based on the forward first arrival time.

7. The method according to claim 6, wherein the seismic source positioning accuracy and a layer number N of the N layers of grids satisfy the following equation:

$$P \geq D/2^{N-1} \text{ and } P < D/2^{N-2}$$

wherein P denotes the seismic source positioning accuracy.

8. The method according to claim 6, wherein the preset condition is that a current node has a maximum energy among all nodes within a search range.

9. The method according to claim 6, wherein before searching all nodes in a first layer of grid to acquire a node satisfying a preset condition therefrom, the method further comprises:

picking up an actual first arrival time of a microseism, correspondingly, the preset condition is that a current node has a minimum time difference among all nodes within a search range, and the time difference is a time difference between the forward first arrival time and the actual first arrival time.

10. A non-transitory computer readable storage medium storing a method according to claim 6 for controlling a computer.

11. A method for positioning a seismic source in microseism monitoring, comprising the steps of:

(1) acquiring a monitoring region and each observation point therein;

(2) performing a first layer of grid partitioning for the monitoring region according to a preset initial side length D of a grid cell, and searching all nodes therein to acquire a node satisfying a preset condition, wherein the initial side length is not more than a double of a distance between the respective observation points, (3) judging whether the side length of a current grid cell satisfies a seismic source positioning accuracy, and if the judgement is No, from i=2, performing an i-th layer of grid partitioning for the monitoring region by taking the side length of the grid cell as $D/2^{i-1}$, wherein i=2, 3, 4 . . . ;

(4) searching nodes satisfying a first preset requirement in the i-th layer of grid, to acquire a node satisfying the preset condition therefrom, the first preset requirement being falling within a circle centered on a node satisfying the preset condition in the (i-1)-th layer of grid with a radius of $\sqrt{2}\times D/2^{i-1}$, and repeating steps (3) and (4) until the judgement in step (3) is Yes; and determining a node satisfying the preset condition in the i-th layer of grid as a seismic source point of the microseism, wherein the method further comprises:

determining, by an acoustic logging well, a forward first arrival time from each node to the respective observation point, and wherein said determining a node satisfying the preset condition, is determined at least based on the forward first arrival time.

12. The method according to claim 11, wherein the preset condition is that a current node has a maximum energy among all nodes within a search range.

13. The method according to claim 11, wherein before searching all nodes in a first layer of grid to acquire a node satisfying a preset condition therefrom, the method further comprises:

picking up an actual first arrival time of a microseism, correspondingly, the preset condition is that a current node has a minimum time difference among all nodes within a search range, and the time difference is a time difference between the forward first arrival time and the actual first arrival time.

14. A non-transitory computer readable storage medium storing a method according to claim 11 for controlling a computer.

15. A method for positioning a seismic source in microseism monitoring, comprising the steps of:

(1) acquiring a monitoring region and each observation point therein;

(2) performing a first layer of grid partitioning for the monitoring region according to a preset initial side length D of a grid cell, and searching all nodes therein to acquire a node satisfying a preset condition, wherein the initial side length is not more than a double of a distance between the respective observation points;

(3) performing a second layer of grid partitioning for the monitoring region by taking the side length of the grid cell as $D/2^{i-1}$, wherein $i=2$, and searching nodes satisfying a first preset requirement in the second layer of grid to acquire a node satisfying the preset condition therefrom; wherein the first preset requirement is falling within a circle centered on a node satisfying the preset condition in the (i-1)-th layer of grid with a radius of $\sqrt{2} \times D/2^{i-1}$;

(4) judging whether the side length of a current grid cell satisfies a seismic source positioning accuracy, and if the judgement is No, from i=3, performing an i-th layer of grid partitioning for the monitoring region by taking the side length of the grid cell as $D/2^{i-1}$, wherein i=3,4 . . . ;

(5) searching nodes satisfying a second preset requirement in the i-th layer of grid, to acquire a node satisfying the preset condition therefrom, the second preset requirement being falling within a circle centered on a node satisfying the preset condition in the (i-2)-th layer of grid with a radius of $\sqrt{2} \times D/2^{i-2}$, and simultaneously falling within the circle centered on the node satisfying the preset condition in the (i-1)-th layer of grid with the radius of $\sqrt{2} \times D/2^{i-1}$; and repeating steps (4) and (5) until the judgement in step (4) is Yes; and determining a node satisfying the preset condition in the i-th layer of grid as a seismic source point of the microseism, wherein the method further comprises:

determining, by an acoustic logging well, a forward first arrival time from each node to the respective observation point, and wherein said determining a node satisfying the preset condition, is determined at least based on the forward first arrival time.

16. The method according to claim 15, wherein the preset condition is that a current node has a maximum energy among all nodes within a search range.

17. The method according to claim 15, wherein before searching all nodes in a first layer of grid to acquire a node satisfying a preset condition therefrom, the method further comprises:

picking up an actual first arrival time of a microseism, correspondingly, the preset condition is that a current node has a minimum time difference among all nodes within a search range, and the time difference is a time difference between the forward first arrival time and the actual first arrival time.

18. A non-transitory computer readable storage medium storing a method according to claim 15 for controlling a computer.

* * * * *